US011865915B2

(12) United States Patent
Jeong et al.

(10) Patent No.: US 11,865,915 B2
(45) Date of Patent: Jan. 9, 2024

(54) THREE-DIMENSIONAL AUGMENTED REALITY HEAD-UP DISPLAY FOR POSITIONING VIRTUAL IMAGE ON GROUND BY MEANS OF WINDSHIELD REFLECTION METHOD

(71) Applicant: NAVER LABS CORPORATION, Seongnam-si (KR)

(72) Inventors: Eunyoung Jeong, Seongnam-si (KR); Jae Won Cha, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 385 days.

(21) Appl. No.: 17/206,382

(22) Filed: Mar. 19, 2021

(65) Prior Publication Data
US 2021/0208392 A1 Jul. 8, 2021

Related U.S. Application Data

(63) Continuation of application No. PCT/KR2019/013288, filed on Oct. 10, 2019.

(30) Foreign Application Priority Data

Oct. 10, 2018 (KR) .................. 10-2018-0120463

(51) Int. Cl.
*B60K 35/00* (2006.01)
*G02B 26/08* (2006.01)
*G02B 27/01* (2006.01)

(52) U.S. Cl.
CPC .......... *B60K 35/00* (2013.01); *G02B 26/0816* (2013.01); *G02B 27/0101* (2013.01);
(Continued)

(58) Field of Classification Search
CPC ..... G02B 27/00–648; G02B 2027/0105–0198; G02B 26/0816; B60K 2370/00–98; B60K 35/00
See application file for complete search history.

(56) References Cited

U.S. PATENT DOCUMENTS

2016/0313562 A1\* 10/2016 Saisho ...................... B60R 1/00
2018/0067310 A1 3/2018 Tang-Kong
(Continued)

FOREIGN PATENT DOCUMENTS

DE 112015006458 T5 1/2018
JP 2006145998 A 6/2006
(Continued)

OTHER PUBLICATIONS

EESR issued in corresponding EP patent application No. 19872177.1, dated Jul. 19, 2022.
(Continued)

*Primary Examiner* — Bao-Luan Q Le
*Assistant Examiner* — Christopher A Lamb, II
(74) *Attorney, Agent, or Firm* — Greer Burns & Crain Ltd.

(57) ABSTRACT

A three-dimensional augmented reality head-up display includes a display device functioning as a light source; and a freeform surface mirror for reflecting light from the light source onto a windshield of a vehicle. An image created by the light from the light source is focused on the ground in front of the vehicle as a virtual image of a three-dimensional perspective, through a reflection method in which the light from the light source is reflected onto the windshield by means of the freeform surface mirror.

10 Claims, 21 Drawing Sheets

(52) U.S. Cl.
CPC .... *G02B 27/0179* (2013.01); *B60K 2370/149* (2019.05); *B60K 2370/1529* (2019.05); *B60K 2370/1531* (2019.05); *B60K 2370/179* (2019.05); *B60K 2370/182* (2019.05); *B60K 2370/23* (2019.05); *B60K 2370/31* (2019.05); *G02B 2027/0187* (2013.01)

(56) References Cited

U.S. PATENT DOCUMENTS

| 2018/0129051 A1 | 5/2018 | Hung |
| 2021/0260999 A1* | 8/2021 | Masuya ................. B60K 35/00 |

FOREIGN PATENT DOCUMENTS

| JP | 2007272061 A | 10/2007 |
| JP | 2014181025 A | 9/2014 |
| JP | 2015069656 A | 4/2015 |
| JP | 2015197496 A | 11/2015 |
| JP | 2015534124 A | 11/2015 |
| JP | 2016064760 A | 4/2016 |
| JP | 2017056844 A | 3/2017 |
| JP | 6269262 B2 | 1/2018 |
| JP | 2018077400 A | 5/2018 |
| KR | 101409846 B1 | 6/2014 |
| KR | 1020150137422 A | 12/2015 |
| WO | 2017061039 A1 | 4/2017 |
| WO | 2017138242 A1 | 8/2017 |
| WO | 2018066062 A1 | 4/2018 |
| WO | 2018168595 A1 | 9/2018 |

OTHER PUBLICATIONS

Office Action issued in corresponding to Japanese patent application No. 2021-510059, dated Mar. 1, 2022.
Press Release; Naver's future technology that has permeated the atmosphere . . . Activating the ecosystem through 'connection' and 'expansion' of technology; Oct. 10, 2018.
Press Release; Naver Labs unveils 'xDM platform' containing advanced technology in the field of 'location and movement'; Oct. 11, 2018.
https://www.youtube.com/watch?v=6tW6vL3eRok, Oct. 12, 2018.
Press Release; Naver & Naver Labs wins 4 products at CES 2019 Innovation Awards; Nov. 8, 2018.
Press Release; Naver's 20th anniversary, CES 2019 first debuts, dreams of becoming a global technology company; Jan. 4, 2019.
Press Release; Naver, the first CES exhibition, looked around the booth . . . 'Living Environment Intelligence' Revealed; Jan. 9, 2019.
https://www.youtube.com/watch?v=CsCxk_bQk3l, Jan. 7, 2019.
https://www.youtube.com/watch?v=qaRtEUpZBml, Jan. 7, 2019.
ISR issued in PCT/KR2019/013288, dated Jan. 22, 2020.

* cited by examiner

THREE-DIMENSIONAL AUGMENTED REALITY HEAD-UP DISPLAY FOR
POSITIONING VIRTUAL IMAGE ON
GROUND BY MEANS OF WINDSHIELD
REFLECTION METHOD

CROSS-REFERENCE TO RELATED
APPLICATIONS

This is a continuation application of International Application No. PCT/KR2019/013288, filed Oct. 10, 2019, which claims the benefit of Korean Patent Application No. 10-2018-0120463, filed Oct. 10, 2018.

BACKGROUND OF THE INVENTION

Field of Invention

One or more example embodiments of the following description relate to a three-dimensional (3D) head-up display.

Description of Related Art

FIG. 1 illustrates a view of a diagram for describing a focus adjustment to verify information of a conventional head-up display device.

Referring to FIG. 1, a conventional vehicular head-up display (HUD) device refers to a vehicular display device that minimizes unnecessary distraction of a driver by transmitting an image, such as, for example, the current speed, the fuel level, and navigation route guide information, from a display 10 and by projecting the image as a graphic image on a windshield 13 in front of the driver through optical systems 11 and 12. Here, the optical systems 11 and 12 may include a plurality of mirrors configured to change the optical path of the image transmitted from the display 10. The above vehicular head-up display device may induce an immediate response from the driver and may provide convenience at the same time.

In a conventional vehicular head-up display (HUD) device, an image is fixedly present at about 2 to 3 meters (m) in front of a user. In contrast, when driving, the gaze distance of a driver is close to about 300 m. Therefore, the driver drives the vehicle while gazing at a far distance and, to verify information of the head-up display (HUD) device, there is an inconvenience to largely adjust the focus of eyes. That is, the focus of the driver may be repeatedly adjusted between a far distance at which the main field of view (FOV) is present and ~3 m in which the image is formed.

Accordingly, there is a need for development of a three-dimensional (3D) head-up display device that may implement augmented reality in a driving environment and may be free from restrictions on an image expression distance such that the driver may acquire desired information without changing the focus of eyes at a point of view, that is, the perspective at which the driver is gazing while driving.

For example, Korean Patent Registration No. 10-1409846 relates to a 3D augmented reality (AR)-based head-up display device and describes technology about a head-up display device that may provide more realistic information to a driver by three-dimensionally displaying image information augmented as a 3D image based on actual distance information.

BRIEF SUMMARY OF THE INVENTION

One or more example embodiments provide a three-dimensional (3D) augmented reality head-up display that may create augmented reality of a 3D virtual image based on a point of view of a driver by matching a virtual image to the ground using a windshield reflection scheme.

One or more example embodiments provide a structure capable of maximizing light efficiency of an optical system for creating a virtual 3D image matched to the ground in a structure that includes a windshield.

According to an aspect of at least one example embodiment, there is provided a three-dimensional (3D) augmented reality head-up display including a display device configured to function as a light source; and a freeform surface mirror configured to reflect light from the light source toward a windshield of a vehicle, and including a structure in which an image created by the light from the light source is focused on the ground in front of the vehicle as a virtual image of a 3D perspective through a reflection scheme of reflecting the light from the light source on the windshield by the freeform surface mirror.

According to one aspect, the windshield may perform a function of simultaneously reflecting the light from the light source reflected by the freeform surface mirror toward an eye-box and transmitting light from outside.

According to another aspect, the 3D augmented reality head-up display may include a structure in which the light from the light source is transferred to the freeform surface mirror at a lower location than the freeform surface mirror, as a structure in which the display device is located toward a near-field ray among rays that extend to the ground to focus the virtual image on the ground.

According to another aspect, the 3D augmented reality head-up display may further include a fold mirror configured to reduce an entire size of a light path, and a structure in which the light from the light source is transferred in order of the display device, the fold mirror, the freeform surface mirror, and the windshield, or in order of the display device, the freeform surface mirror, the fold mirror, and the windshield.

According to still another aspect, a display plane corresponding to the display device may meet an imaging condition with a virtual image plane corresponding to the ground through the freeform surface mirror.

According to still another aspect, the virtual image may be created based on an imaging condition between a display plane corresponding to the display device and a mirror plane corresponding to the freeform surface mirror and a virtual image plane corresponding to the ground.

According to still another aspect, an angle of the display device may be determined based on an angle of the display plane that meets the imaging condition.

According to still another aspect, an angle of the display device may be determined based on an angle of the display plane, an angle of the windshield, and an angle of a fold mirror that meets the imaging condition.

According to still another aspect, an angle of the freeform surface mirror may be determined based on an angle of the mirror plane and an angle of the windshield that meets the imaging condition.

According to still another aspect, a start location and a size of the virtual image may be determined using an angle that meets the imaging condition on the display plane and the virtual image plane based on a straight line that passes a point at which the normal of the freeform surface mirror and the virtual image plane intersect and an optical center of the freeform surface mirror.

According to still another aspect, a start location and a size of the virtual image may be adjusted based on at least one of the angle, an angle of the display plane based on the virtual image plane, an angle between the display plane and the mirror plane, and a height from the virtual image plane to an optical center of the freeform surface mirror.

According to still another aspect, a separation distance between the display device and the freeform surface mirror at a height from the virtual image plane to the freeform surface mirror may be derived based on a height value acquired by adding an offset toward a corresponding height direction to a height from the virtual image plane to an optical center of the freeform surface mirror, an angle of the display plane based on the virtual image plane, an angle of the mirror plane based on the virtual image plane, and an angle between the display plane and the mirror plane.

According to still another aspect, a location of the freeform surface mirror may be determined using a height that includes an offset according to a required location of an eye-box.

According to some example embodiments, it is possible to provide a three-dimensional (3D) augmented reality head-up display that may create augmented reality of a 3D virtual image based on a point of view of a driver by matching a virtual image to the ground using a windshield reflection scheme.

According to some example embodiments, it is possible to provide a structure capable of maximizing light efficiency of an optical system for creating a virtual 3D image matched to the ground in a structure that includes a windshield.

DETAILED DESCRIPTION OF THE INVENTION

Hereinafter, example embodiments will be described with reference to the accompanying drawings.

The following example embodiments may be modified in various forms and the scope of the disclosure is not limited to the following example embodiments. Also, the various example embodiments are provided to further fully explain the disclosure to those skilled in the art. Shapes and sizes of elements illustrated in the figures may be simplified or may be reduced or exaggerated for simplicity of description.

Figure 1:
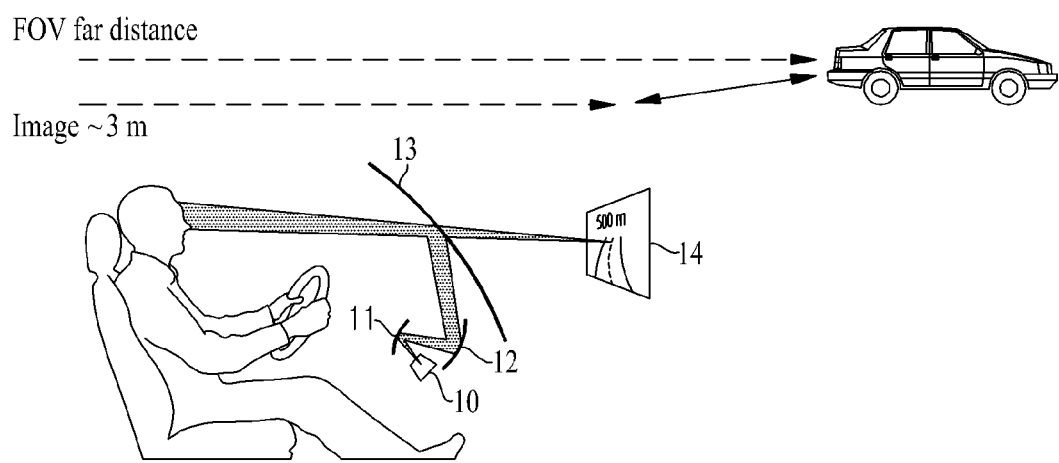
FIG. 1 illustrates a view of a diagram for describing a focus adjustment to verify information of a general head-up display device.

In addition to the existing head-up display described with FIG. 1, many displays, such as a television (TV), a monitor, a projector screen, and a virtual reality (VR)/augmented reality (AR) glass, are provided in a direction perpendicular to the gaze of a user.

The example embodiments provide a three-dimensional (3D) augmented reality head-up display having a 3D implementation scheme of locating an image to correspond to the ground, i.e., locating an image on the ground. In particular, the example embodiments may provide a 3D augmented reality head-up display optimized for a point of view of a driver in a driving environment by representing a virtual screen as a 3D perspective laid to correspond to the ground.

Figure 2:
FIG. 2 illustrates a diagram showing an example of a location of an image of a three-dimensional (3D) augmented reality head-up display according to one embodiment.

FIG. 2 illustrates an example of a location of an image of a 3D augmented reality head-up display according to an example embodiment.

Referring to FIG. 2, the 3D augmented reality head-up display according to an example embodiment may represent a location of an imaginary image, that is, a virtual image 24 viewed with the eyes of a user as a 3D perspective laid to correspond to a floor, that is, the ground 25, in front of a driver.

An image through an optical system of a conventional vehicular head-up display is located at a fixed distance of 2 to 3 meters (m) in front of the driver and is generally perpendicular to the ground 25. Dissimilarly, the 3D augmented reality head-up display according to an example embodiment is to locate the virtual image 24 on a virtual plane corresponding (parallel) to the ground 25 in front of the driver.

The 3D augmented reality head-up display according to an example embodiment employs a scheme of creating the virtual image 24 visible with eyes by reflecting an image through an optical system of the head-up display, and not a scheme of creating an actual image by directly projecting onto a screen, such as a projector.

Main information provided from a vehicular navigation device includes route information on a road being driven, lane information, and information on the distance to a vehicle in front. Also, an advanced driver-assistance system (ADAS) provides safety related information to the driver. Here, the information generally includes lane information, information on the distance to a vehicle in front/next, and unexpected information. Likewise, a vehicle that is an entity to be driven may need to provide a passenger with information on a situation that may happen in the future, such as, for example, a turn or a lane change on a road during autonomous driving. The route information may include turn-by-turn (TBT) information used to guide a route.

Figure 3:
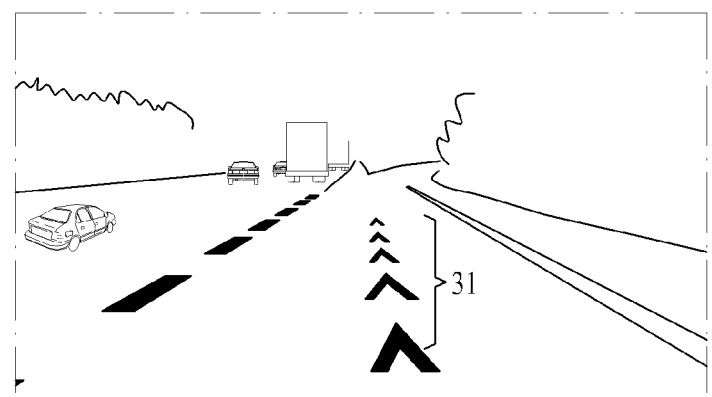
FIG. 3 illustrates a diagram showing an image provided on a virtual plane corresponding to the ground, such as a road surface, according to an embodiment.
Figure 3:
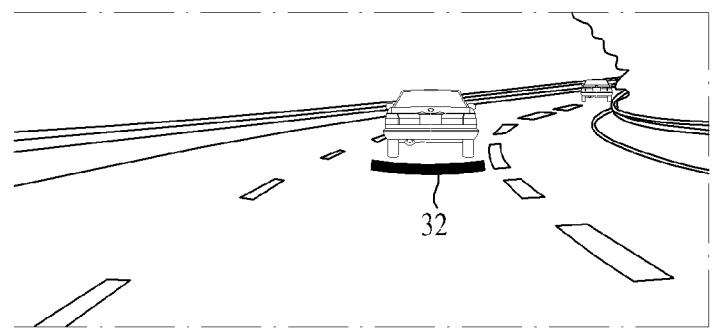

Referring to FIG. 3, it is important and effective to display the aforementioned information, for example, lane information 31 and information 32 on the distance to the vehicle in front, as a virtual image on an actual road surface at a point of view of the driver. The lane information 31 may refer to driving information or navigation information to be displayed on a driving lane.

The 3D augmented reality head-up display according to an example embodiment may represent a virtual screen as a 3D perspective laid to correspond to the ground and thereby may implement information desired to transfer to the user as augmented reality on the road surface actually gazed by the user while driving without a need to shift the focus of eyes from a point of view of the user while driving to another location in various driving environments.

A head-up display of an aftermarket product is generally implemented using a combiner (freeform mirror) scheme. A built-in product is generally implemented using a windshield reflection scheme of directly reflecting image light on a windshield of a vehicle without using an additional part (combiner).

The 3D augmented reality head-up display according to an example embodiment includes a combination function of combining light from a light source and light from outside (foreground) and transferring the combined light to the eyes of a driver and an optical function (3D function) of creating a 3D virtual reality image based on a point of view of the driver by matching a virtual image to the ground in front of the driver.

The 3D augmented reality head-up display according to an example embodiment relates to using the windshield reflection scheme. Here, the windshield functions as the combination function and may use the optical part that includes a freeform surface mirror (hereinafter, also referred to as a freeform mirror) for the 3D function.

Figure 4:
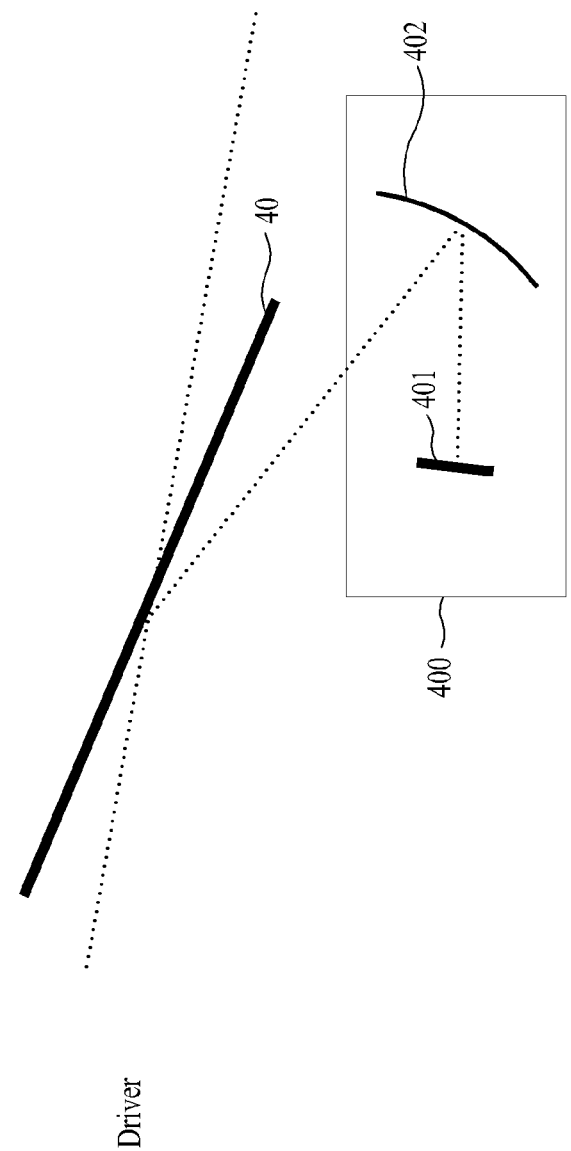
FIG. 4 illustrates a diagram of a 3D augmented reality head-up display of a windshield reflection scheme according to an embodiment.

Referring to FIG. 4, a 3D augmented reality head-up display 400 according to an example embodiment relates to a configuration of creating a virtual 3D image through a reflection scheme that includes a windshield 40 of a vehicle, and may include a display device 401 configured to function as a light source and a freeform mirror 402 configured to focus an imaginary image on the ground in front of a driver by reflecting light from the light source to the windshield 40. The windshield 40 may also function to simultaneously reflect the light from the light source reflected by the freeform mirror 402 toward an eye-box (the location of an eye of the driver) and to transmit light from outside (front of the vehicle).

That is, the 3D augmented reality head-up display 400 may locate the imaginary image on the ground in front of the driver by including a structure of projecting the light from the light source onto the ground through the freeform mirror 402 and the windshield 40.

The 3D augmented reality head-up display 400 of the windshield reflection scheme may be implemented by deriving locations and angles of the display device 401 and the freeform mirror 402 relative to the ground into consideration of an angle of the windshield 40.

Figure 5:
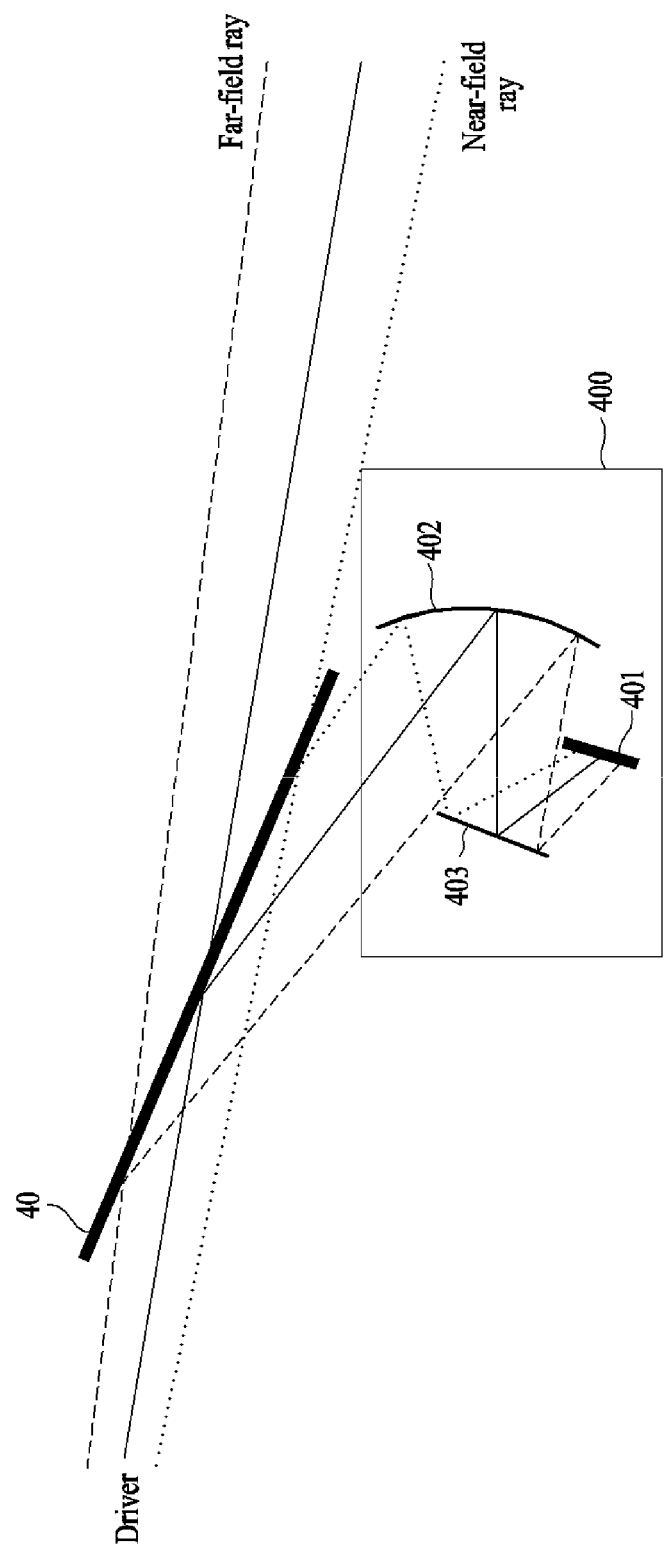
FIG. 5 illustrates a diagram of an optical design configuration of a 3D augmented reality head-up display of a windshield reflection scheme according to an embodiment.

FIG. 5 illustrates an example of an optical design configuration of a 3D augmented reality head-up display of a windshield reflection scheme according to an example embodiment.

Referring to FIG. 5, a 3D augmented reality head-up display 400 of a windshield reflection scheme according to an example embodiment may be in a structure in which light emitted from the display device 401 is located toward a far-field ray and transferred to the freeform mirror 402 in an optical path of an image transmitted from the display device 401, and may further include a fold mirror 403 configured to reduce the entire size of the optical path. Here, it is assumed that the windshield 40 and the fold mirror 403 have no optical power or properties. The far-field ray may refer to a ray that forms a virtual image at the farthest distance on the ground from the driver among the rays emitted by the display device 401 and extending to the ground to focus the virtual image on the ground. Conversely, a ray that forms the virtual image at the nearest distance on the ground from the driver among rays emitted by the display device 401 and extending to the ground to focus the virtual image on the ground may be referred to as a near-field ray.

Reducing the entire size of the optical path represents reducing an entire size of an area occupied by the path through which the light is emitted from the display device 401 and finally reaches the windshield. In the case of using the fold mirror 403, the entire length of the optical path may be identical, but the entire size of the area occupied by the optical path may be reduced.

The light emitted by the display device 401 may be directly transferred from the display device 401 to the freeform mirror 402 or may be reflected and transferred through the fold mirror 403. Here, the light from the light source may be implemented in a structure to be transferred to the freeform mirror 402 at a location close to the far-field ray.

Figure 6:
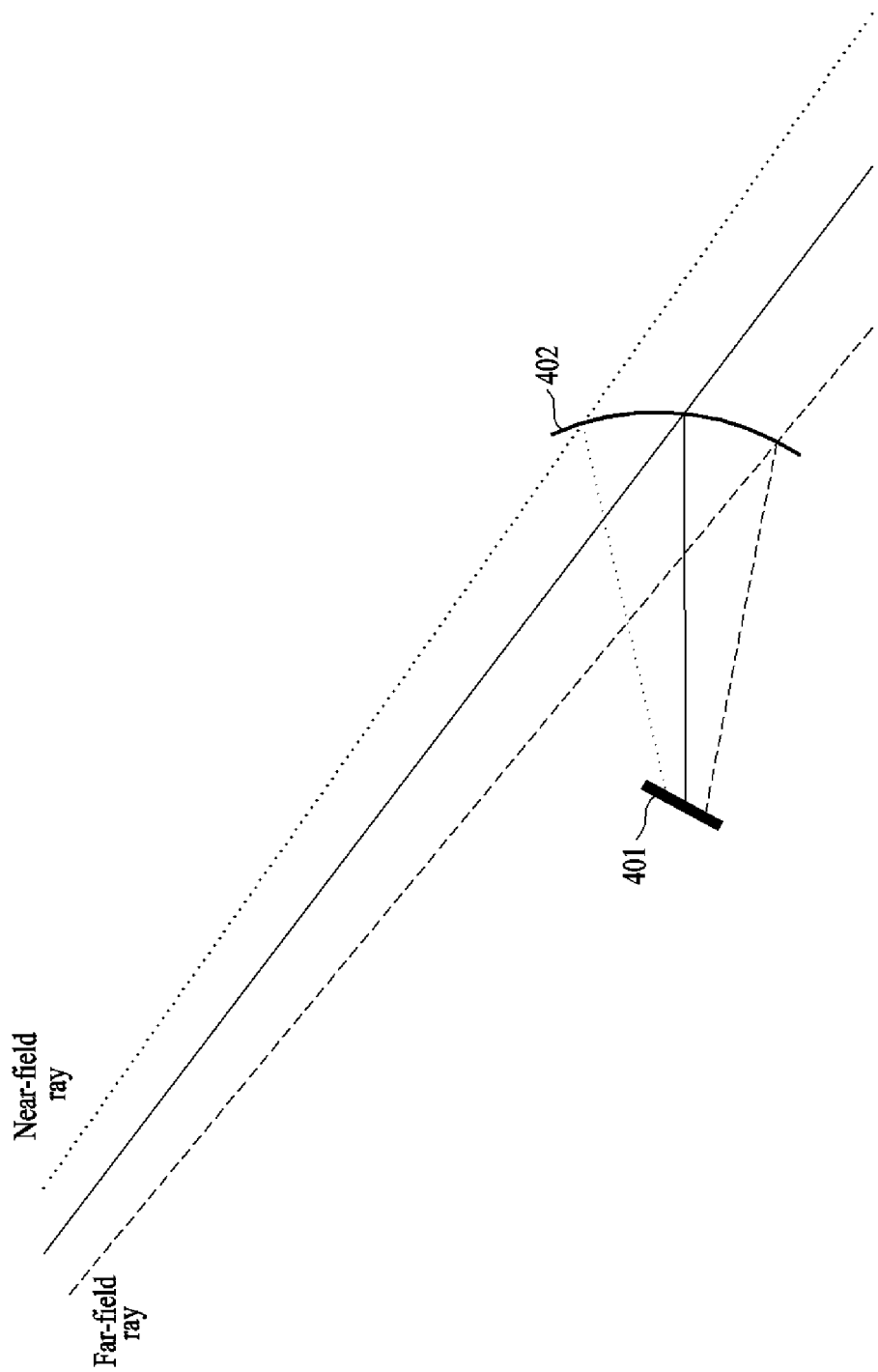
FIGS. 6 to 8 illustrate diagrams of equivalent expression for deriving a theoretical relational equation of the optical design configuration of FIG. 5 according to an embodiment.
Figure 7:
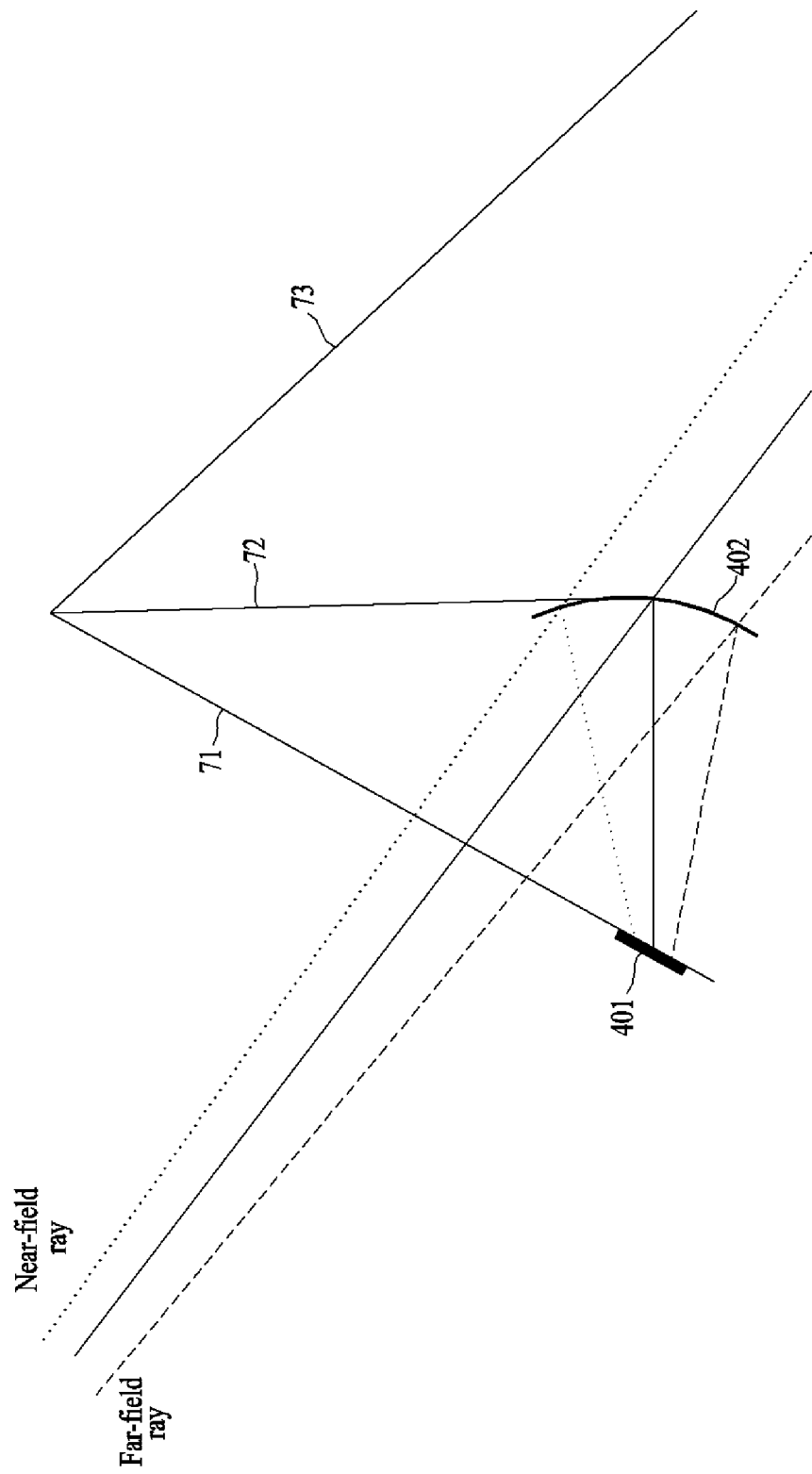
Figure 8:
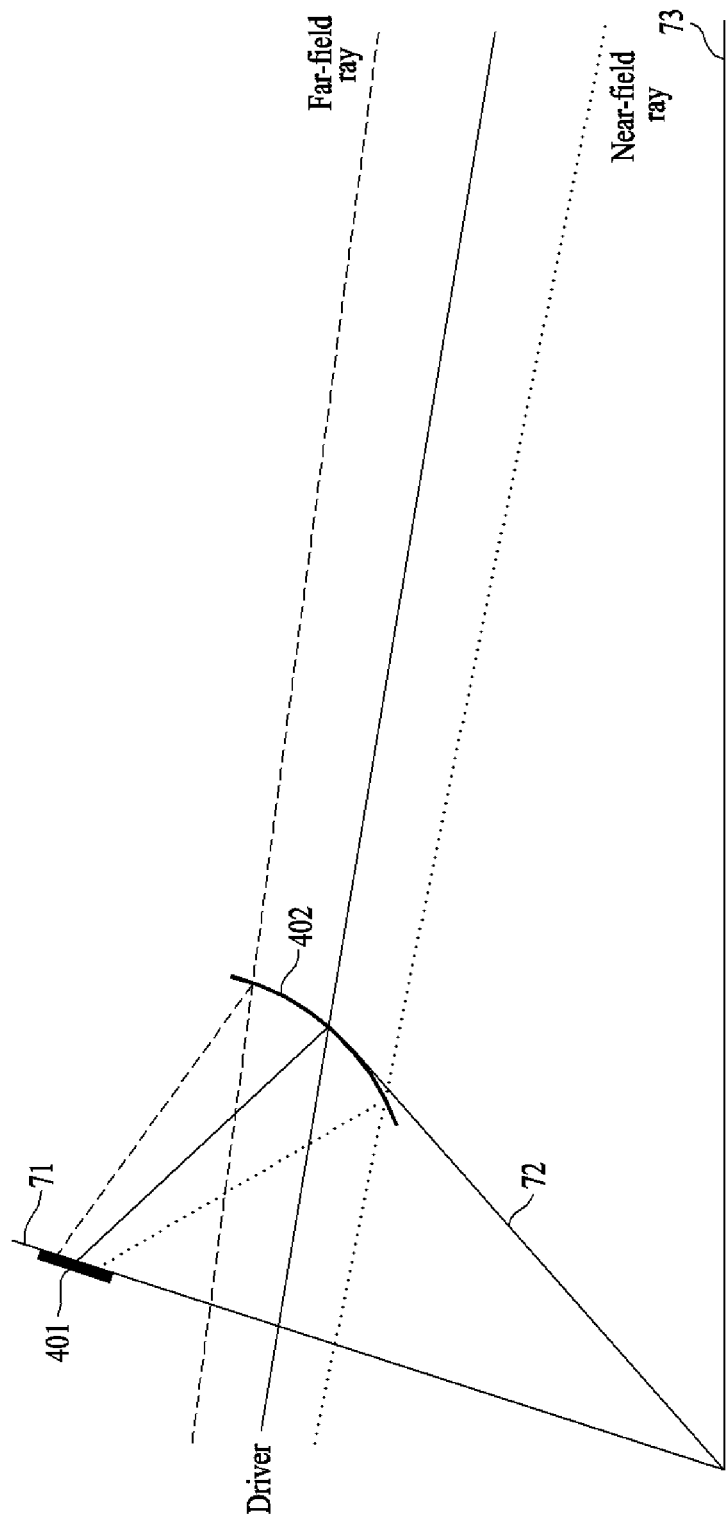

For clarity of description of a process of deriving a theoretical relational equation between the display device 401 and the freeform mirror 402 to focus the virtual image on the ground, as an equivalent structure in which an optical path changed by the fold mirror 403 and the windshield 40 is simplified as illustrated in FIG. 6, illustration of the fold mirror 403 and the windshield 40 having no optical function aside from the function of changing the optical path may be omitted and a location of the display device 401 may be represented at a symmetrical location based on the fold mirror 403. Next, as illustrated in FIG. 7, a display plane 71 corresponding to the display device 401, a freeform mirror plane 72 corresponding to the freeform mirror 402, and a virtual image plane 73 corresponding to the ground may be added. As illustrated in FIG. 8, the virtual image plane 73 may rotate to be parallel to the ground and may be expressed in a state of being inverted left and right based on the Y-axis (a vertical axis in the figure).

Referring to FIG. 8, the 3D augmented reality head-up display 400 of the windshield reflection scheme may include a structure in which light emitted from the display device 401 is transferred to the freeform mirror 402 at an upper location than the freeform mirror 402, that is, a structure in which the display device 401 is located toward a far-field ray compared to a near-field ray close to a location of the driver among rays emitted toward the ground to focus the virtual image on the ground. In other words, the display device 401 is located closer to the far-field ray than to the near-field ray, and closer to the driver's position among the rays emitted to the ground to focus a virtual image on the ground.

Figure 9:
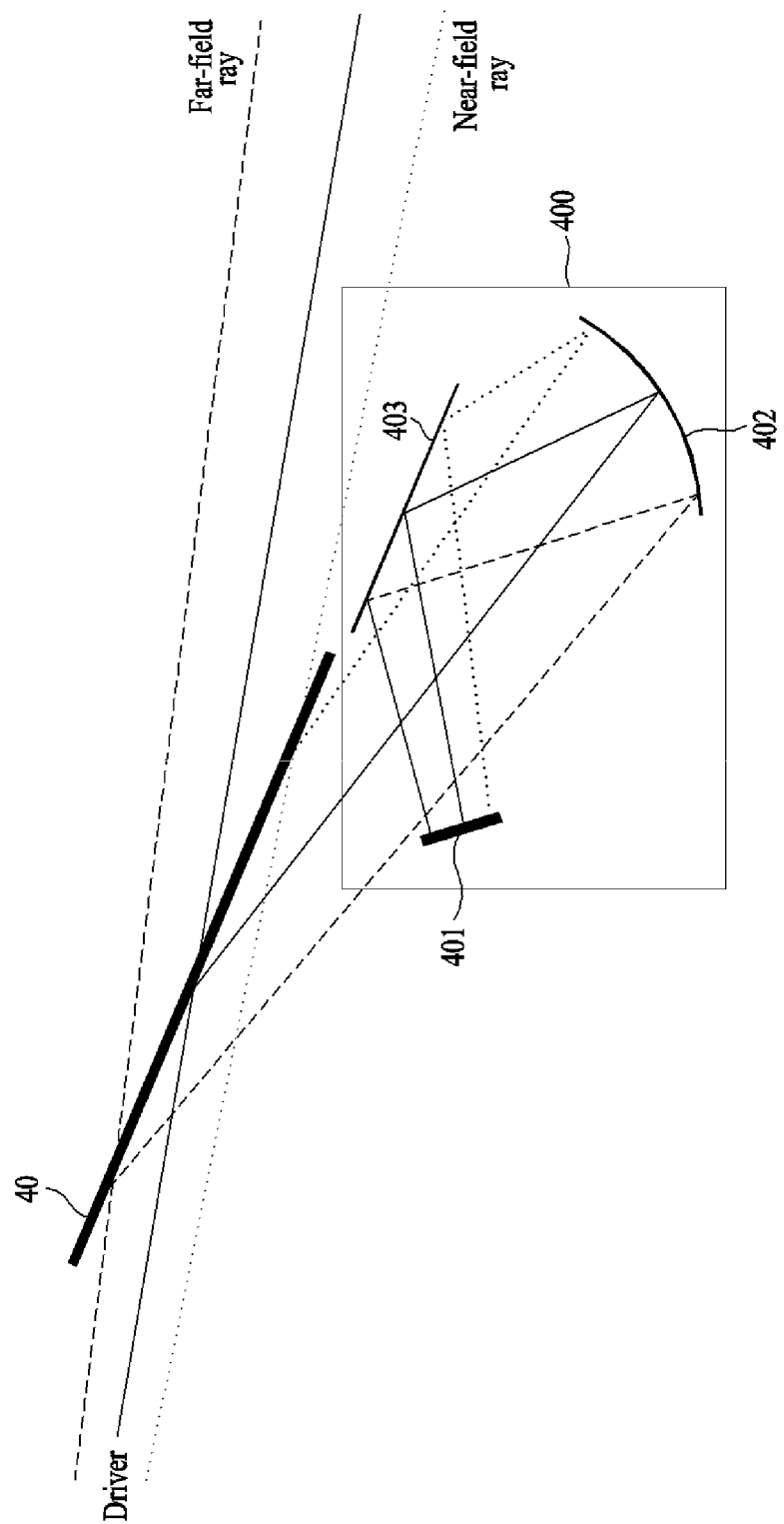
FIG. 9 illustrate another diagram of an optical design configuration of a 3D augmented reality head-up display of a windshield reflection scheme according to an embodiment.
Figure 10:
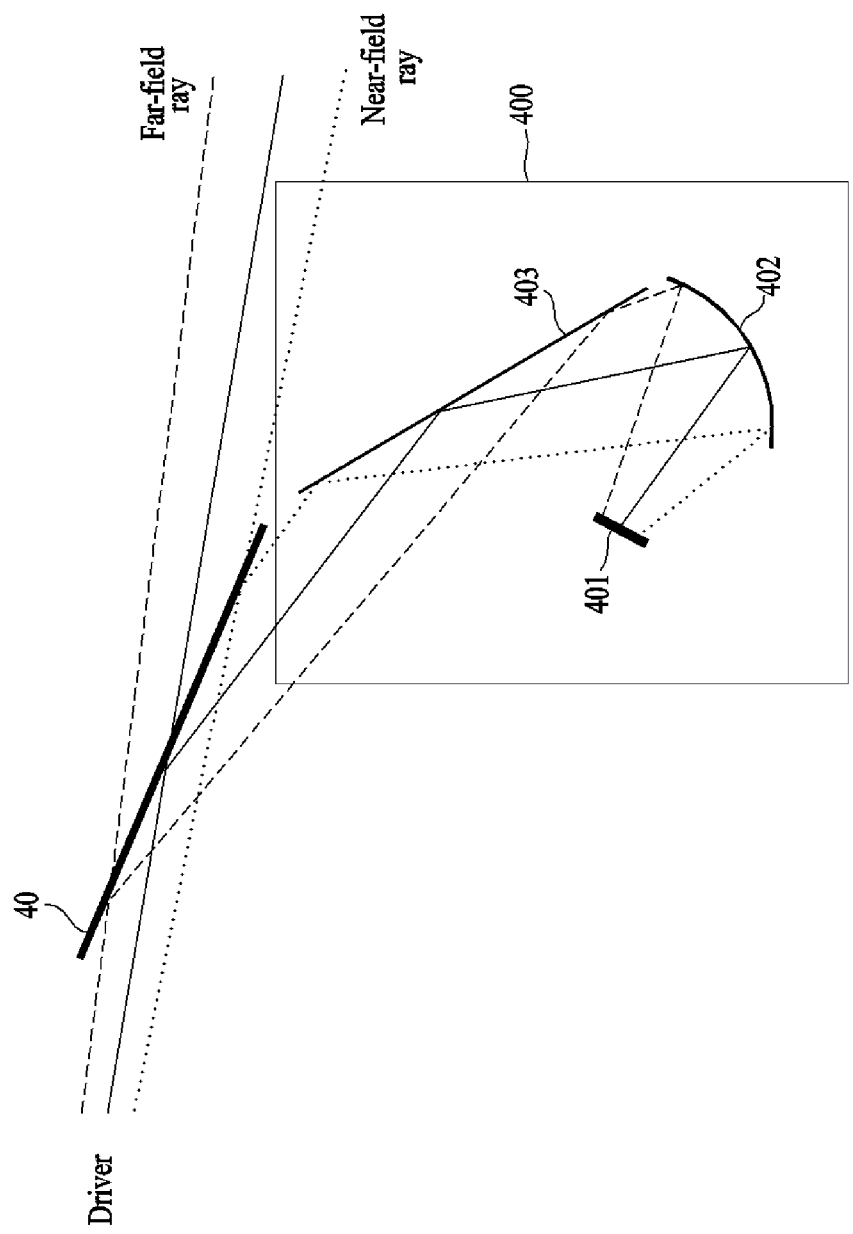
FIG. 10 illustrates still another diagram of an optical design configuration of a 3D augmented reality head-up display of a windshield reflection scheme according to an embodiment.

FIG. 9 illustrate another example of an optical design configuration of a 3D augmented reality head-up display of a windshield reflection scheme according to an example embodiment, and FIG. 10 illustrates still another example of an optical design configuration of a 3D augmented reality head-up display of a windshield reflection scheme according to an example embodiment.

Referring to FIGS. 9 and 10, the 3D augmented reality head-up display 400 of the windshield reflection scheme according to an example embodiment may be in a structure in which light emitted from the display device 401 is located toward a near-field ray, i.e., closer to the near-field ray than to the far-field ray, and transferred to the freeform mirror 402 and may further include the fold mirror 403 configured to reduce the entire size of the optical path. Likewise, it is assumed that the windshield and the fold mirror 403 have no optical power.

The light emitted from the display device 401 may be directly transferred from the display device 401 to the freeform mirror 402 or may be reflected and transferred through the fold mirror 403. Here, the light from the light source may be emitted from a location close to the near-field ray to the freeform mirror 402.

As illustrated in FIG. 9, a light travel path may be implemented in order of the display device 401, the fold mirror 403, the freeform mirror 402, the windshield and the driver. Also, as illustrated in FIG. 10, the light may be transferred in order of the display device 401, the freeform mirror 402, the fold mirror 403, and the windshield 40.

Figure 11:
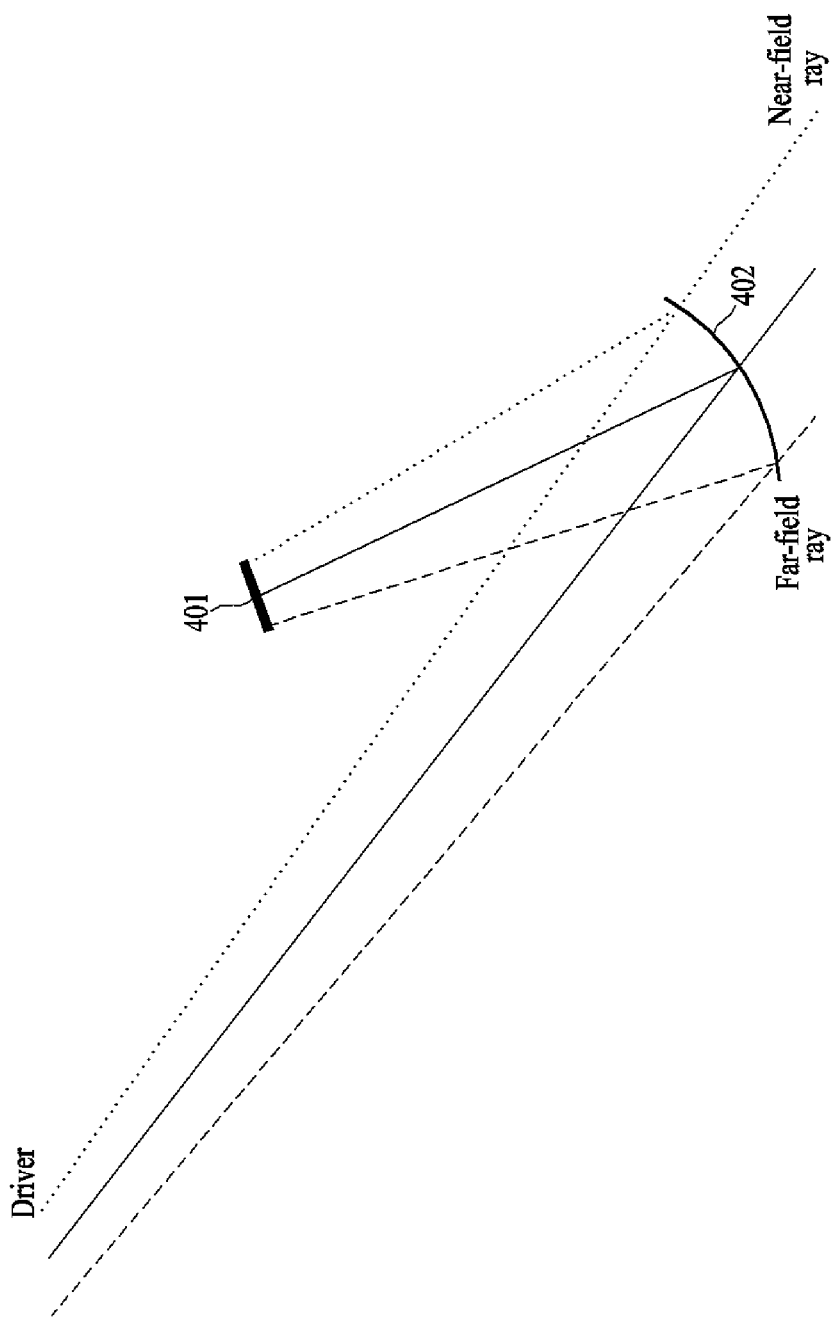
FIGS. 11 to 13 illustrate diagrams of equivalent expression for deriving a theoretical relational equation of the optical design configuration of FIG. 9 according to an embodiment.
Figure 12:
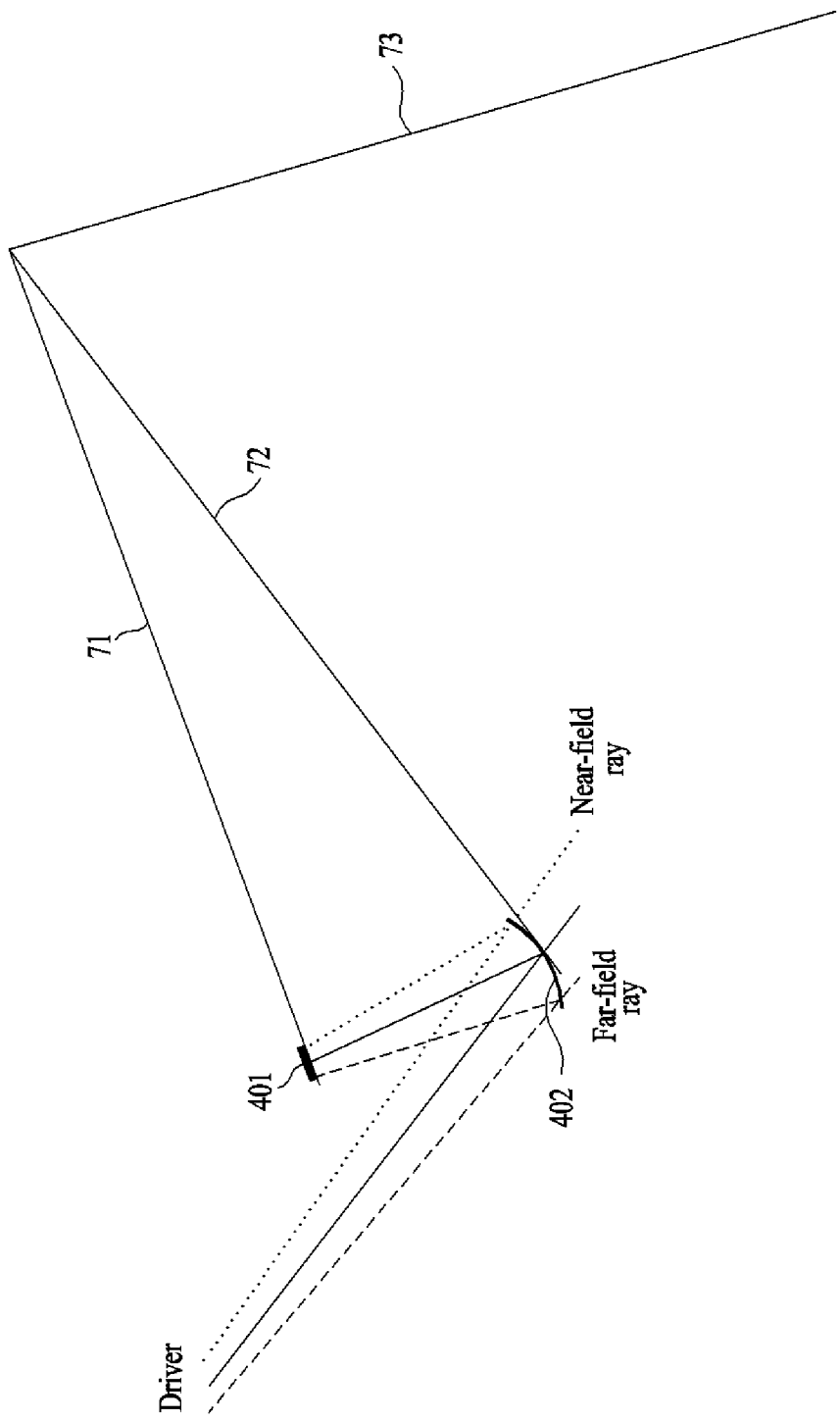
Figure 13:
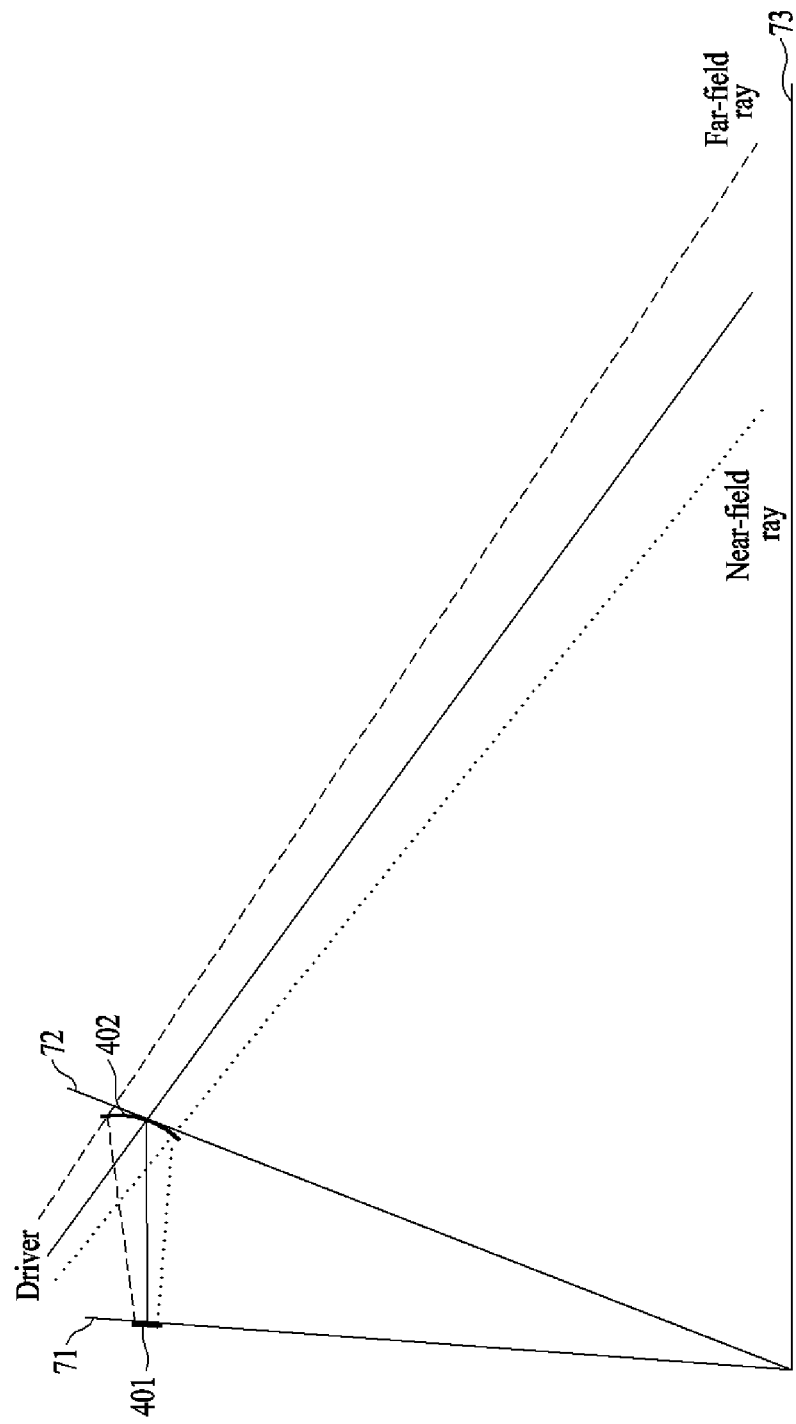

For clarity of description of a process of deriving a theoretical relational equation between the display device 401 and the freeform mirror 402 to focus the virtual image on the ground with respect to the optical design configuration of FIG. 9, as an equivalent structure in which an optical path changed by the fold mirror 403 and the windshield 40 is simplified as illustrated in FIG. 11, illustration of the fold mirror 403 and the windshield 40 having no optical function aside from a function of changing the optical path may be omitted and a location of the display device 401 may be represented at a symmetrical location based on the fold mirror 403, i.e., a symmetrical position with the fold mirror 403 as the axis. Next, as illustrated in FIG. 12, the display plane 71 corresponding to the display device 401, the freeform mirror plane 72 corresponding to the freeform mirror 402, and the virtual image plane 73 corresponding to the ground may be added. As illustrated in FIG. 13, the virtual image plane 73 may rotate to be parallel to the ground and may be expressed in a state of being inverted left and right based on the Y-axis (a vertical axis in the figure).

Referring to FIG. 13, the 3D augmented reality head-up display 400 of the windshield reflection scheme may include a structure in which light emitted from the display device 401 is transferred to the freeform mirror 402 at a lower location than the freeform mirror 402, that is, a structure in which the display device 401 is located toward a near-field ray relatively close to the location of the driver among rays emitted toward the ground to focus the virtual image on the ground.

When comparing output of each angle of light emitted from the display device 401, output of a vertical component is highest and the further away from the vertical, the lower the output. Therefore, to use light of a vertical angle or a near-vertical angle due to low output may be advantageous in terms of light efficiency.

Figure 14:
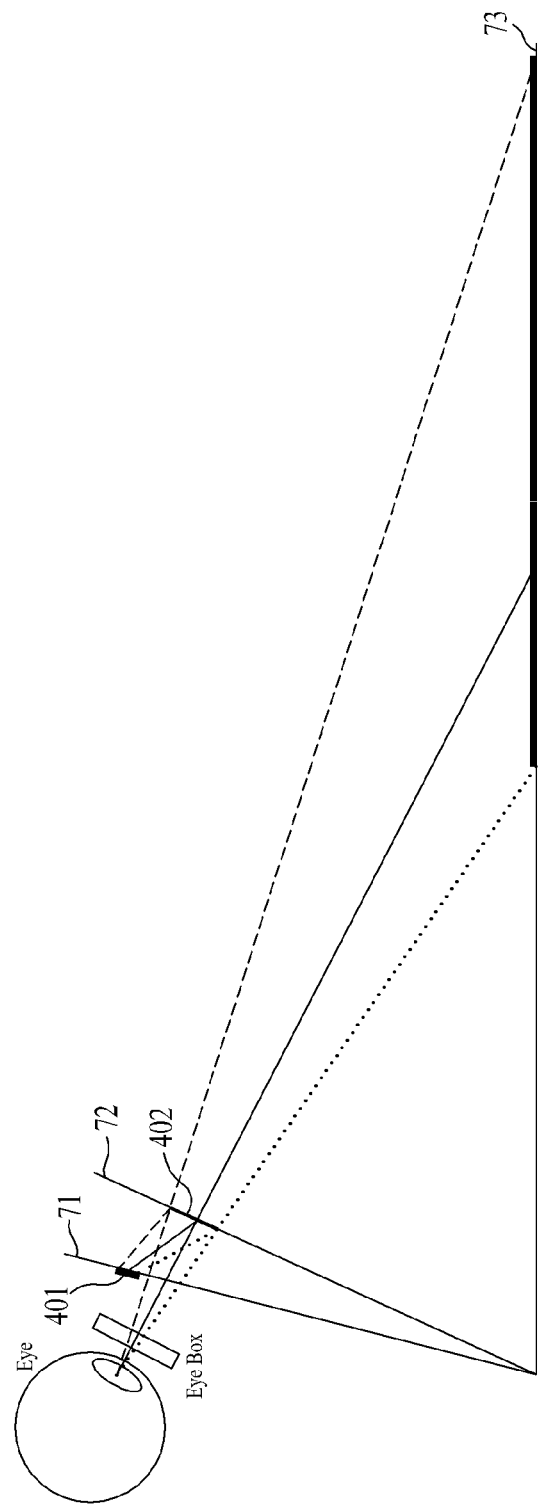
FIGS. 14 to 17 illustrate diagrams showing light efficiency according to an optical design configuration of a 3D augmented reality head-up display according to an embodiment.

According to the equivalent structure of FIG. 8 that represents the optical design configuration of FIG. 5, the display device 401 is located to be above the freeform mirror 402 and thereby located toward a far-field ray in front of the driver as illustrated in FIG. 14.

Figure 15:
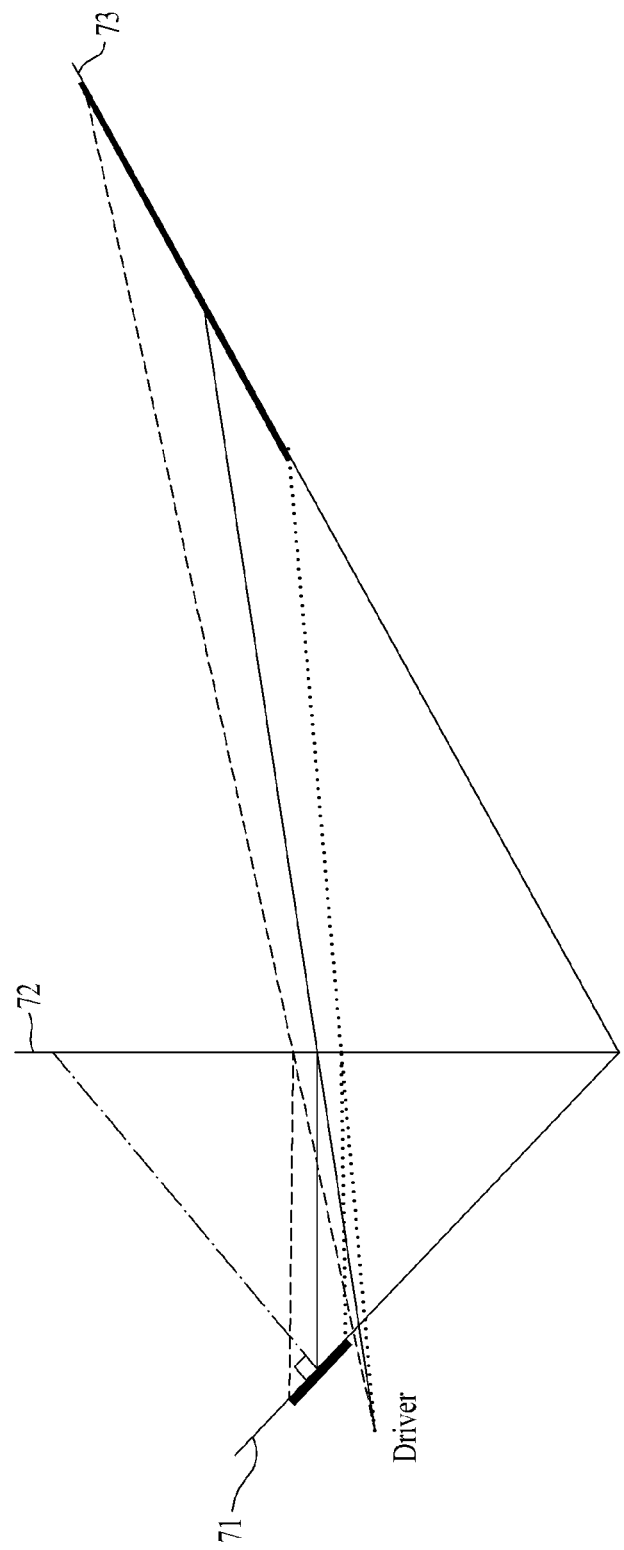

If rotating the equivalent structure of FIG. 8 that represents the optical design configuration of FIG. 5 such that the freeform mirror plane 72 may be vertical as illustrated in FIG. 15, most of the light of a vertical component with strong output in the light emitted from the display device 401 may be discarded and light with a relatively low output component may be mainly used. Therefore, there is a probability that light efficiency may decrease.

To apply an optical design configuration in which the display device 401 is located above the freeform mirror 402 to the 3D augmented reality head-up display 400 of the windshield reflection scheme, a display device capable of adjusting an angle of light emission, that is, a display device that includes an additional optical element, such as a diffraction element, a micro-lens array, and a digital micromirror device, may be used, thereby ensuring the light efficiency.

Figure 16:
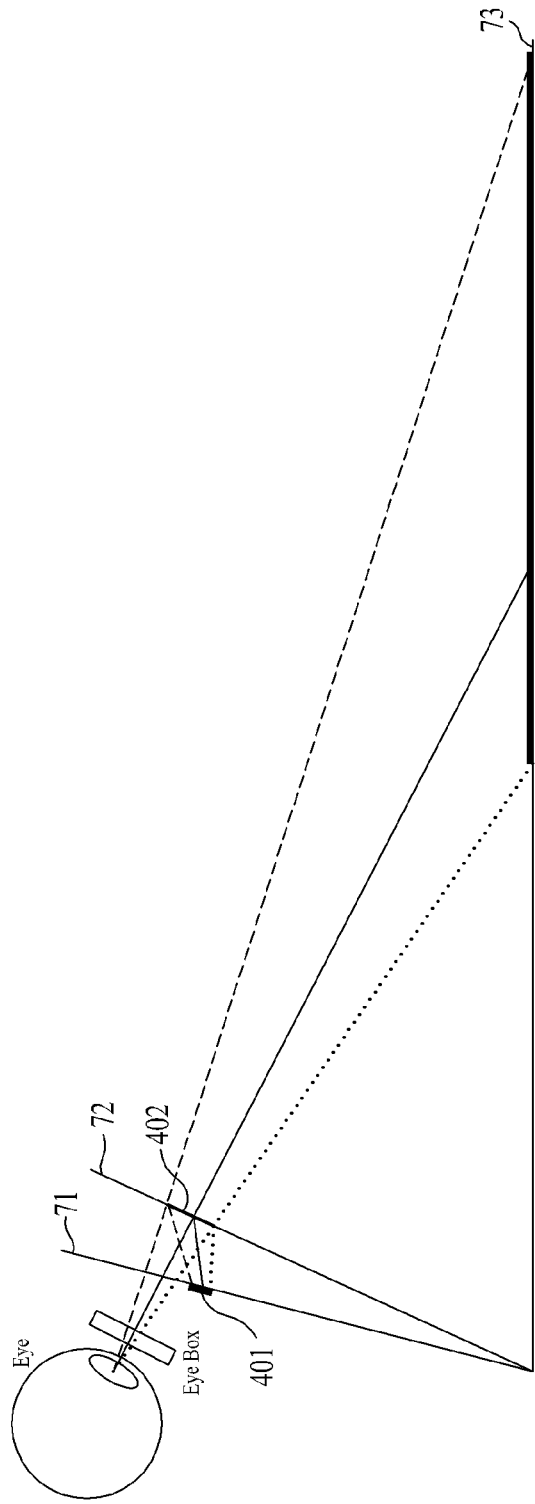

Meanwhile, according to the equivalent structure of FIG. 13 that represents the optical design configuration of FIG. 9, the display device 401 is located to be below the freeform mirror 402 and thereby located toward a near-field ray in front of the driver as illustrated in FIG. 16.

Figure 17:
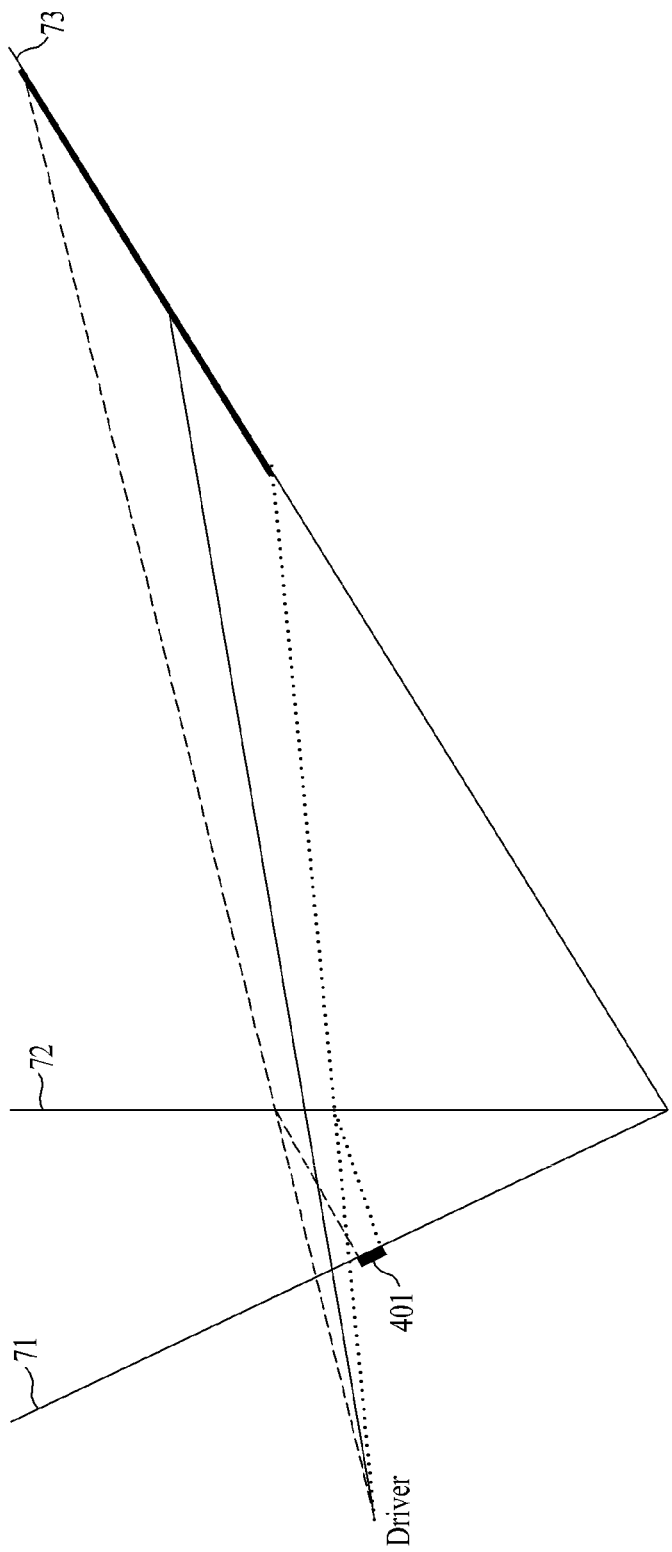

If rotating the equivalent structure of FIG. 13 that represents the optical design configuration of FIG. 9 such that the freeform mirror plane 72 may be vertical as illustrated in FIG. 17, most of the light of a vertical component with strong output in the light emitted from the display device 401 may be used. Therefore, it can be said that the light efficiency is high.

An actual path through which light travels starts from the display device 401 and is reflected by the freeform mirror 402 and the windshield 40 and, here, the reflected light reaches the eye of the driver and is focused on the retina by the lens. However, an image viewed by the user is the virtual image 24, not an actual image at a location of the display plane 71 at which the actual image is created. Here, the virtual image 24 is located on the virtual image plane 73 that is a virtual plane corresponding to the ground. That is, the display plane 71 meets an imaging condition with the virtual image plane 73 through the freeform mirror 402.

A theoretical relational equation between the display device 401 and the freeform mirror 402 to create the virtual image at a location corresponding to the ground may be derived based on an imaging condition between the display plane 71 corresponding to the display device 401 excluding the eye of the user, the freeform mirror plane 72 corresponding to the freeform mirror 402, and the virtual image plane 73 corresponding to the ground. Also, a focal length of the freeform mirror plane 72 may be a single variable of the imaging condition.

Figure 18:
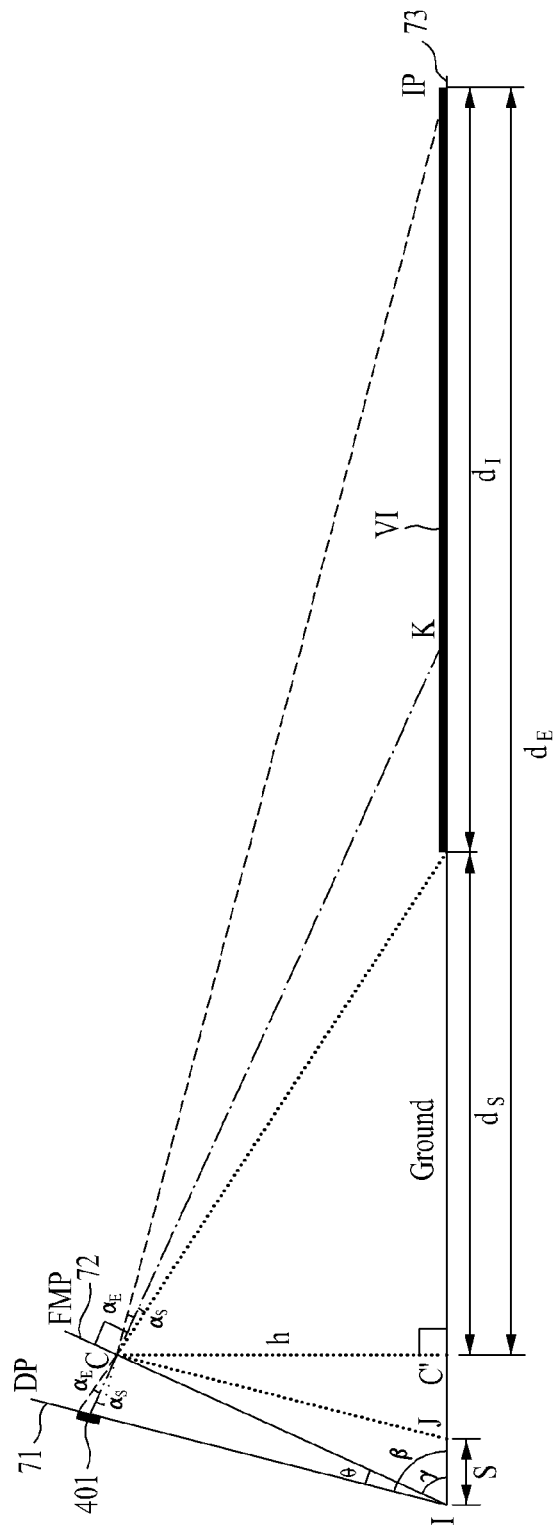
FIG. 18 illustrates a diagram showing variables required to derive a relational equation between a display device and a freeform mirror of a 3D augmented reality head-up display according to an embodiment.

FIG. 18 illustrates variables required to derive a relational equation between the display device 401 and the freeform mirror 402.

Referring to FIG. 18, an intersection (I) between the display plane 71 and the freeform mirror plane 72 may be present on the ground. That is, the display plane 71, the freeform mirror plane 72, and the virtual image plane 73 may simultaneously intersect at a predetermined location (I). An optical system may be set such that the display plane 71, the freeform mirror plane 72, and the virtual image plane 73 may meet the imaging condition under the above condition.

DP represents the display plane 71 corresponding to the display device 401, FMP represents the freeform mirror plane 72 corresponding to the freeform mirror 402, and IP represents the virtual image plane 73 that indicates a plane itself corresponding to the ground.

C represents an optical center of the freeform mirror 402 relative to the display device 401. Here, C may not necessarily to be located on the actual freeform mirror 402 and an offset may be applied at a location of the freeform mirror 402 based on a location of a user gaze. As the user gaze is set at a higher location, the offset may be set to a greater value. As the user gaze is set at a lower location, the offset may be set to a smaller value. Accordingly, as the user gaze is set at the higher location, the freeform mirror 402 may be installed to be high. As the user gaze is set at the lower location, the freeform mirror 402 may be installed to be low. Regardless of this change, the mathematical relational equation between the overall optical system and internal components may be maintained to be the same.

Hereinafter, the relational equation is induced with the assumption that C is located on the freeform mirror 402.

I represents an intersection at which the DP 71, the FMP 72, and the IP 73 meet, J represents a point at which a straight line that is parallel to the DP 71 and passes through the center C intersects the IP 73, and K refers to an intersection with the normal of the freeform mirror 402 on the IP 73 and represents a point at which a straight line that is perpendicular to the FMP 72 and passes through the center C intersects the IP 73.

$\alpha$ ($\alpha_E$, $\alpha_S$) represents an angle of a location that meets the imaging condition on the DP 71 and the IP 73 based on a straight line that passes through the center C and the intersection K. Here, since the corresponding location meets the imaging condition, an orientation angle of the DP 71 and an orientation angle of the IP 73 match at all times. Here, the imaging condition refers to a condition that light emitted from the light source in an omnidirectional solid angle reaches the same point of the virtual image (VI) by the freeform mirror 402. In FIG. 18, that the imaging condition is met represents that, as locations and angles of the display device 401, the freeform mirror 402, and of the IP 73 at which the virtual image (VI) is created, and a focal length (f) of the freeform mirror meet a lens formula, the light emitted from the display device 401 converges on the IP 73 through the freeform mirror and the virtual image (VI) is created on the IP 73. Here, although example embodiments describe an example in which not a real image but the virtual image (VI) is created, it will be understood by those skilled in the art that the light does not actually reach the IP 73 and an extending line of the emitted ray converges on the IP 73 to thereby form the virtual image (VI).

$\beta$ represents an angle of the DP 71 from the IP 73 or the ground, $\gamma$ represents an angle of the FMP 72 from the IP 73 or the ground, and $\theta$ represents an angle between the DP 71 and the FMP 72.

h represents a distance from the IP 73 or the ground to the center C, and h' (see FIG. 19) represents a value acquired by adding an offset (positive number or negative number) toward an h direction to h (a height of the actual freeform mirror 402). Here, h' corresponds to a case in which an offset according to the location of the user gaze is applied to the location of the freeform mirror 402.

S represents a length between the intersection I and the intersection J, that is, a separation distance between the DP 71 and the FMP 72 at the height h in an axial direction parallel to the ground.

S' (see FIG. 19) represents a separation distance between the DP 71 and the FMP 72 at the height h' (see FIG. 19) in the axial direction parallel to the ground.

$d_S$ represents a distance from an orthogonal location C' between the center C of the freeform mirror 402 and the IP 73 or the ground to a location at which the virtual image (VI) starts, on the IP 73 or the plane corresponding to the ground.

$d_E$ represents a distance from the orthogonal location C' between the center C of the freeform mirror 402 and the IP 73 or the ground to a location at which the virtual image (VI) ends on the IP 73 or the plane corresponding to the ground.

$d_I$ represents the size of the virtual image (VI), and f represents the focal length of the freeform mirror 402.

Initially, a relational equation among $\beta$, $\gamma$, and $\theta$ is expressed as follows.

If an imaging condition between the DP 71 and the IP 73 is applied, the following Equation 1 is established.

$$\sin(\gamma - \theta) = \frac{h}{f}\sin\theta \qquad \text{[Equation 1]}$$

Here, all of $\gamma$, $\theta$, h, a d f are assumed as positive numbers.

In Equation 1, h denotes a height from the ground to a location of the 3D augmented reality head-up display 400 on a dashboard in a vehicle (accurately, the height to the optical center C of the freeform mirror 402). Also, f denotes the focal length of the freeform mirror 402 of the 3D augmented reality head-up display 400 having a general size and curvature.

If Equation 1 is substituted with values of h and f a numerical relation between $\theta$ and $\gamma$ may be derived. Based on this, $\beta$ may be derived through a relational expression $\beta=\gamma+\theta$.

Next, S may be derived using h, $\beta$, $\gamma$, and $\theta$ through Equation 2.

$$S = h\frac{\sin\theta}{\sin\beta\sin\gamma} \qquad \text{[Equation 2]}$$

Also, $d_S$, $d_E$, and $d_I$ may be derived through Equation 3.

$$d_S = h \tan(\gamma+\alpha_S)$$

$$d_E h \tan(\gamma\alpha_E)$$

$$d_I = h(\tan(\gamma+\alpha_E)-\tan(\gamma+\alpha_S)) \qquad \text{[Equation 3]}$$

Here, $\alpha$ ($\alpha_E$, $\alpha_S$) denotes a positive number or a negative number based on a straight line that passes the center C and the intersection K.

Using Equation 3, $d_S$ and $d_I$ may be calculated. Here, if $d_S$ representing the start location of the virtual image (VI) and $d_I$ representing the size of the virtual image (VI) need to be adjusted, an optical configuration may be optimized by adjusting at least one of $\alpha$ ($\alpha_E$, $\alpha_S$), $\beta$, and $\theta$.

Through the above relational equations, the angles of the DP 71 and the FMP 72 relative to the ground and the location and the size of the virtual image (VI) may be derived.

Figure 19:
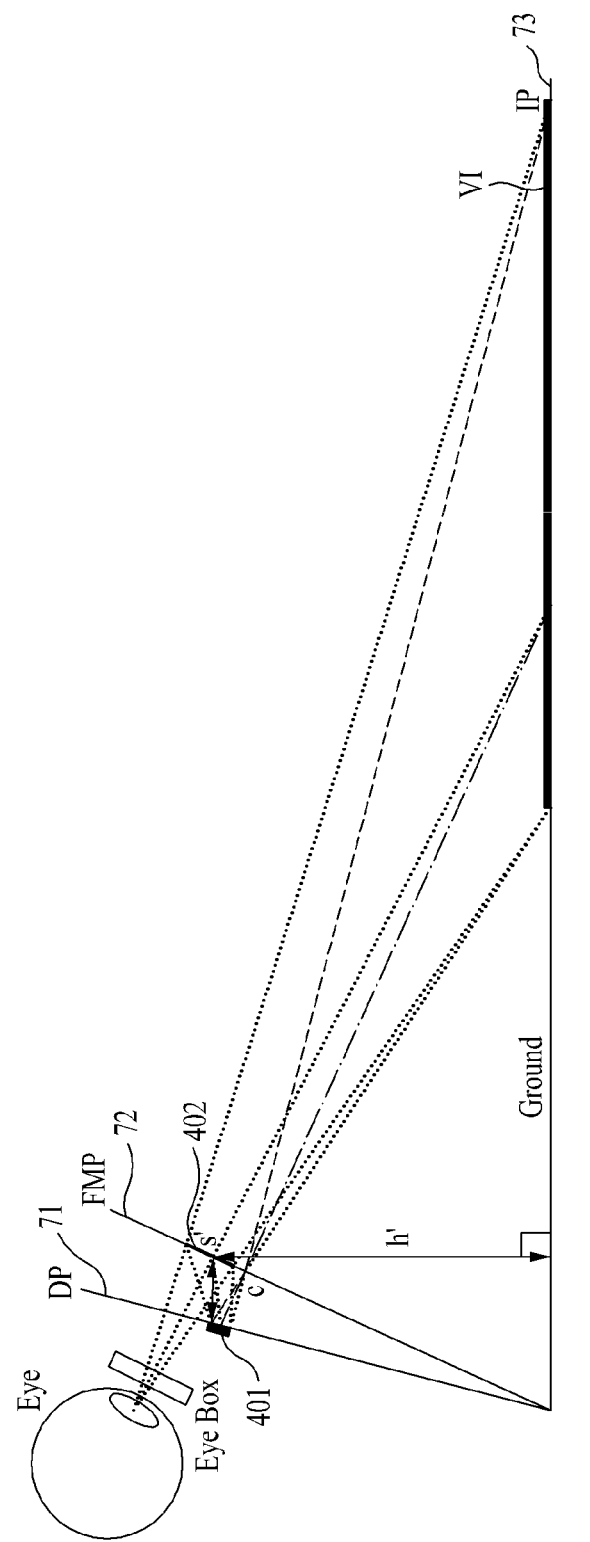
FIG. 19 illustrates a diagram showing a location of a freeform mirror determined based on an eye-box (a location of pupil) according to an embodiment.

FIG. 19 illustrates an example of describing a location of the freeform mirror 402 that is determined based on an eye-box (a location of pupil) by the 3D augmented reality head-up display 400.

Referring to FIG. 19, the required height of an eye-box (the location of pupil) may be generally determined as a height at which an eye is located when a driver sits in the driver's seat. The distance between the eye-box and the freeform mirror 402 is determined as a distance from the eye to the freeform mirror 402 of the 3D augmented reality head-up display 400 shown in FIG. 4.

The height h' of the location of the freeform mirror 402 is determined by including an offset based on the location of the eye-box and the location may not necessarily include the optical center C of the freeform mirror 402. The separation distance s' between the DP 71 and the FMP 72 may be determined based on h'. Here, s' may be referred to as the distance between the display device 401 and the freeform mirror 402.

Figure 20:
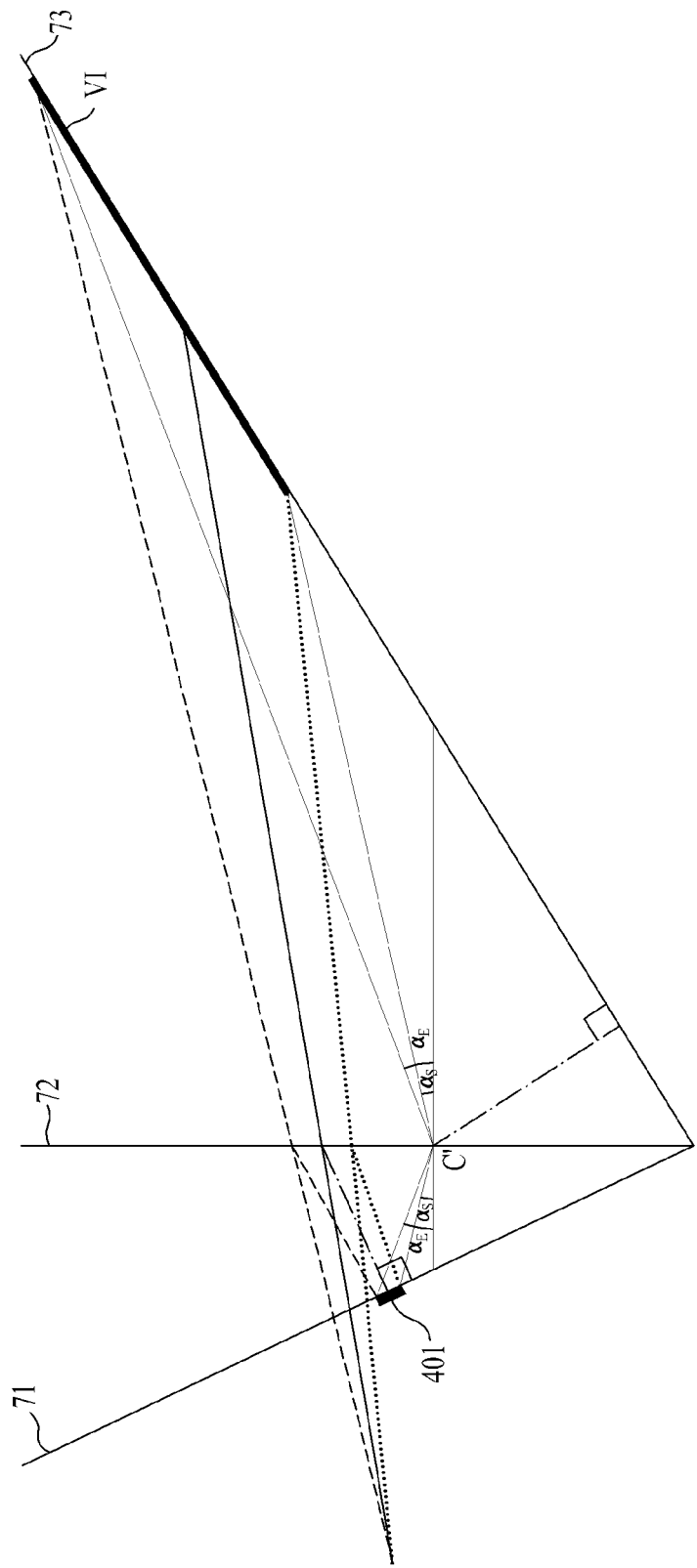
FIG. 20 illustrates a diagram showing an imaging condition between a display plane and a freeform mirror plane and a virtual image plane according to an embodiment.

If rotating the equivalent structure of FIG. 13 that represents the optical design configuration of FIG. 9 such that the freeform mirror plane 72 may be vertical, an angle α (a E, as) of a location that meets the imaging condition on the DP 71 and the IP 73 and an orientation angle of the DP 71 and an orientation angle of the IP 73 match as illustrated in FIG. 20.

Likewise, in a structure in which the display device 401 is located to be close to a far-field ray as well as in a structure in which the display device 401 is located to be close to a near-field ray, positional angles $\alpha_E$ and as of the light source and the virtual image are unified at all times. In other words, $\alpha_E$ and as are the same if the imaging conditions are satisfied in DP 71 and IP 73.

Figure 21:
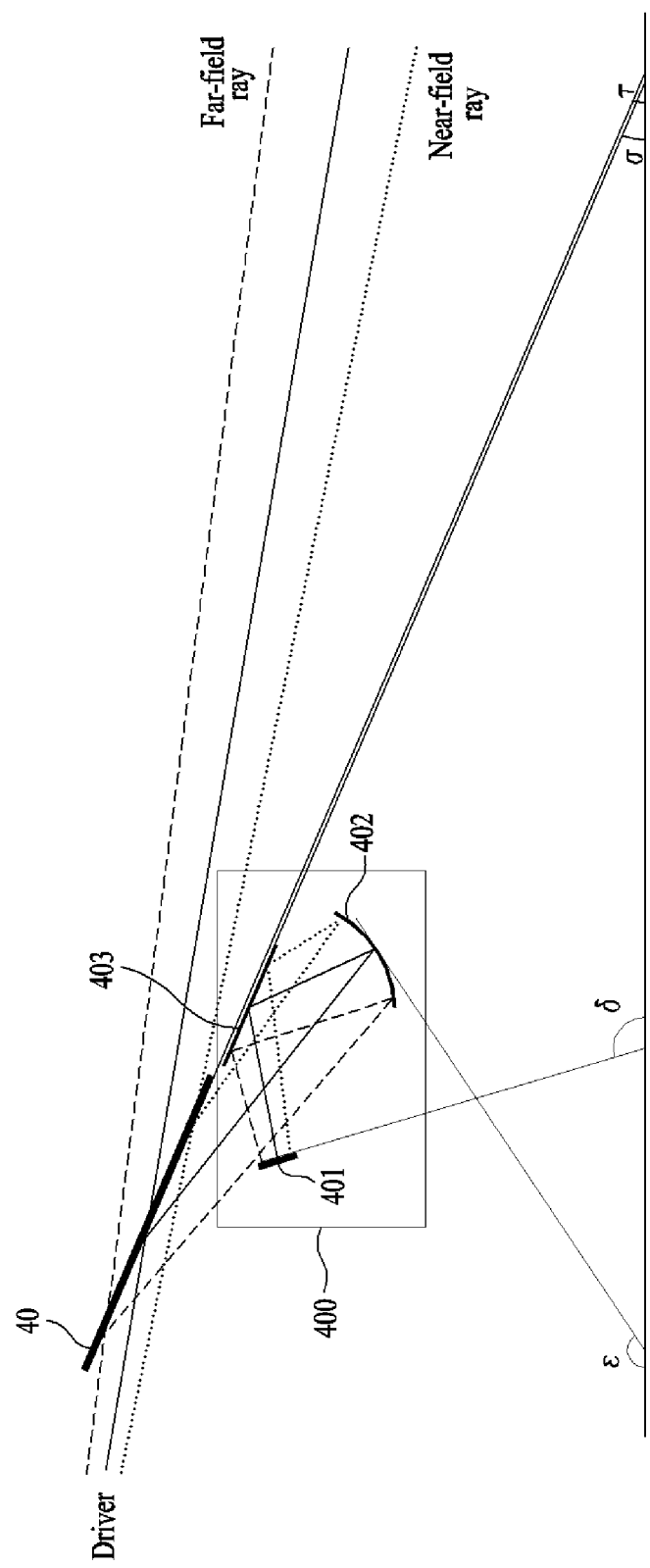
FIG. 21 illustrates a diagram showing variables required to derive angles of a display device and a freeform mirror of a 3D augmented reality head-up display of a windshield reflection scheme according to an embodiment.

FIG. 21 illustrate variables required to derive angles of the display device 401 and the freeform mirror 402 taking the windshield 40 and the fold mirror 403 into consideration. FIG. 21 illustrates an optical design configuration of a structure in which the display device 401 is located to be close to a near-field ray.

Referring to FIG. 21, δ represents an angle of the display device 401 from the ground, ε represents an angle of the freeform mirror 402 from the ground, σ represents an angle of the fold mirror 403 from the ground, and τ represents an angle of the windshield 40 from the ground.

The angles of the display device 401 and the freeform mirror 402 may be derived as follows based on the theoretical relational equation between the display device 401 and the freeform mirror 402 described above with reference to FIG. 18.

The angle of the display device 401 may be derived using the angle (β) of the DP 71 that meets the imaging condition and may be derived through, for example, Equation 4 or Equation 5.

$$\delta = \beta + 2 \times (\tau - \sigma)(\text{if} \neq \tau) \quad [\text{Equation 4}]$$

$$\delta = \beta (\text{if } \sigma = \tau) \quad [\text{Equation 5}]$$

The angle of the freeform mirror 402 may be derived using the angle (γ) of the FMP 72 that meets the imaging condition and may be derived through, for example, Equation 6.

$$\varepsilon = \gamma + 2\tau \quad [\text{Equation 6}]$$

Therefore, the 3D augmented reality head-up display 400 according to an example embodiment may implement a virtual image (VI) of a 3D perspective laid to correspond to the ground in front of the driver using the windshield reflection scheme through the display device 401 and the freeform mirror 402 based on the above relational equations.

The 3D augmented reality head-up display 400 of the windshield reflection scheme of locating a virtual 3D image on the ground by deriving the angle of the display device 401 based on the ground using the angle 41) of the DP 71 and by deriving the angle of the freeform mirror 402 based on the ground using the angle (γ) of the FMP 72 at a location at which the imaging condition between the DP 71 and the IP 73 is met may be implemented.

According to some example embodiments, it is possible to provide a 3D augmented reality head-up display that may create augmented reality of a 3D virtual image based on a point of view of a driver by matching a virtual image to the ground using a windshield reflection scheme. In particular, it is possible to provide a structure capable of maximizing light efficiency of an optical system for creating a virtual 3D image matched to the ground in a structure that includes a windshield.

The apparatuses described herein may be implemented using hardware components, software components, or a combination thereof. For example, the apparatuses and the components described herein may be implemented using one or more general-purpose or special purpose computers, such as, for example, a processing device, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. A processing device may also access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may, be embodied in any type of machine, component, physical equipment, virtual equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in non-transitory computer-readable media. Here, the media may continuously store computer-executable programs or may transitorily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of other media may include record media and storage media managed by an app store that distributes applications or a site that supplies and distributes other various types of software, a server, and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A three-dimensional (3D) augmented reality head-up display of a vehicle, comprising:
a display device configured to function as a light source; and
a freeform surface mirror configured to reflect light from the light source toward a windshield of the vehicle,
wherein an image created by the light from the light source is focused on the ground in front of the vehicle as a virtual image of a 3D perspective through a reflection scheme of reflecting the light from the light source on the windshield by the freeform surface mirror,
wherein the virtual image is created based on an imaging condition among a display plane corresponding to the display device, a mirror plane corresponding to the freeform surface mirror, and a virtual image plane corresponding to the ground,
wherein the imaging condition is met when, based on a lens formula, the light from the display device is focused on the virtual image plane by the freeform surface mirror, and
wherein, under the imaging condition being met, a separation distance (S) between the display device and the freeform surface mirror is determined based on a height value (h) from the virtual image plane (IP) to an optical center (C) of the freeform surface mirror, an angle (3) between the display plane (DP) and the virtual image plane (IP), an angle (γ) between the mirror plane (FMP) and the virtual image plane (IP), and an angle (θ) between the display plane (DP) and the mirror plane (FMP).

2. The 3D augmented reality head-up display of claim 1, wherein the windshield simultaneously reflects the light from the light source reflected by the freeform surface mirror toward an eye-box and transmits light from outside.

3. The 3D augmented reality head-up display of claim 1, wherein the display device is located toward a near-field ray among rays that extend to the ground to focus the virtual image on the ground, and the light from the light source is transferred to the freeform surface mirror at a lower location than the freeform surface mirror, as a structure in which the display device is located toward a near-field ray among rays that extend to the ground to focus the virtual image on the ground.

4. The 3D augmented reality head-up display of claim 1, further comprising:
a fold mirror configured to reduce an entire size of a light path,
wherein the light from the light source is transferred in order of the display device, the fold mirror, the freeform surface mirror, and the windshield, or in order of the display device, the freeform surface mirror, the fold mirror, and the windshield.

5. The 3D augmented reality head-up display of claim 1, wherein an angle of the display device is determined based on an angle of the display plane that meets the imaging condition.

6. The 3D augmented reality head-up display of claim 1, wherein an angle of the display device is determined based on an angle of the display plane, an angle of the windshield, and an angle of a fold mirror that meet the imaging condition.

7. The 3D augmented reality head-up display of claim 1, wherein an angle of the freeform surface mirror is determined based on an angle of the mirror plane and an angle of the windshield that meet the imaging condition.

8. The 3D augmented reality head-up display of claim 1, wherein a start location and a size of the virtual image are determined using an angle that meets the imaging condition on the display plane and the virtual image plane based on a straight line that passes a point at which the normal of the freeform surface mirror and the virtual image plane intersect and an optical center of the freeform surface mirror.

9. The 3D augmented reality head-up display of claim 8, wherein the start location and the size of the virtual image are adjusted based on at least one of the angle used to determine the start location and the size of the virtual image, an angle of the display plane based on the virtual image plane, an angle between the display plane and the mirror plane, and a height from the virtual image plane to an optical center of the freeform surface mirror.

10. The 3D augmented reality head-up display of claim 1, wherein a location of the freeform surface mirror is determined using a height that includes an offset according to a required location of an eye-box.

* * * * *